(12) United States Patent
Drelich et al.

(10) Patent No.: US 12,202,451 B2
(45) Date of Patent: Jan. 21, 2025

(54) ELECTROPNEUMATIC TRAILER CONTROL MODULE

(71) Applicant: ZF CV Systems Europe BV, Brussels (BE)

(72) Inventors: Lukasz Drelich, Czestochowa (PL); Aleksander Fila, Wroclaw (PL); Paulina Kuncewicz, Wroclaw (PL); Marek Smardz, Wschowa (PL); Pawel Swiatek, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 570 days.

(21) Appl. No.: 17/452,426

(22) Filed: Oct. 27, 2021

(65) Prior Publication Data
US 2023/0130519 A1    Apr. 27, 2023

(51) Int. Cl.
| | |
|---|---|
| *B60T 13/66* | (2006.01) |
| *B60T 8/17* | (2006.01) |
| *B60T 8/171* | (2006.01) |
| *B60T 8/88* | (2006.01) |
| *B60T 8/94* | (2006.01) |
| *B60T 13/40* | (2006.01) |

(52) U.S. Cl.
CPC .......... *B60T 13/662* (2013.01); *B60T 8/1708* (2013.01); *B60T 8/171* (2013.01); *B60T 8/885* (2013.01); *B60T 8/94* (2013.01); *B60T 13/403* (2013.01); *B60T 2270/413* (2013.01); *B60T 2270/88* (2013.01)

(58) Field of Classification Search
CPC . B60T 8/94; B60T 8/171; B60T 8/323; B60T 8/327; B60T 8/885; B60T 13/385; B60T 13/683; B60T 8/1708; B60T 8/1701; B60T 2270/10; B60T 2270/402; B60T 2270/413
USPC .......................................................... 303/7
See application file for complete search history.

(56) References Cited

U.S. PATENT DOCUMENTS

| | | | |
|---|---|---|---|
| 6,079,790 A * | 6/2000 | Broome | B60T 8/00 303/119.2 |
| 8,297,713 B2 | 10/2012 | Soupal | |
| 2020/0079341 A1 * | 3/2020 | Van Thiel | B60T 8/1708 |
| 2020/0139952 A1 * | 5/2020 | Van Thiel | B60T 13/385 |
| 2020/0207319 A1 | 7/2020 | Van Thiel | |
| 2021/0001824 A1 * | 1/2021 | Schmidt | B60T 8/327 |

\* cited by examiner

*Primary Examiner* — Robert A. Siconolfi
*Assistant Examiner* — San M Aung
(74) *Attorney, Agent, or Firm* — Dickinson Wright PLLC (57) ABSTRACT

An electropneumatic trailer control module (1) includes a trailer control connection (6) configured to deliver a trailer control pressure (pTC), an electropneumatic trailer control valve arrangement (20) configured to receive a supply pressure (pS) and to provide the trailer control pressure (pTC) and an electronic trailer control connection (24) for providing trailer braking control signals (STB) such that the trailer control pressure (pTC) can be modulated. The electropneumatic trailer control module (1) is characterized by a protection connection (10) for receiving a pneumatic protection pressure (pPR), and a tractor protection unit (22) configured to switch between a supply state (60) and a protection state (56). The invention further relates to an electropneumatic braking system (100), a vehicle (200) and a method (300) for controlling a trailer supply function of an electropneumatic braking system (100).

16 Claims, 5 Drawing Sheets

ELECTROPNEUMATIC TRAILER CONTROL MODULE

TECHNICAL FIELD

The present disclosure relates to an electropneumatic trailer control module for an electropneumatic braking system of a tractor-trailer combination, in particular a commercial-vehicle combination. The electropneumatic trailer control module comprises an air supply connection configured to be connected to a compressed air supply providing a supply pressure, a trailer supply connection configured to deliver a trailer supply pressure for the trailer vehicle, a trailer control connection configured to deliver a trailer control pressure for the trailer vehicle, an electropneumatic trailer control valve arrangement connected to the air supply connection and configured to receive the supply pressure and to provide the trailer control pressure, and an electronic trailer control connection for receiving braking signals and providing respective trailer braking control signals at the electropneumatic trailer control valve arrangement such that the trailer control pressure can be modulated. The present disclosure further relates to an electropneumatic braking system, a method for controlling a trailer supply function of an electropneumatic braking system and a vehicle.

BACKGROUND

Vehicles, in particular commercial vehicles, are regularly equipped with pneumatic braking systems. In a vehicle combination of a tractor vehicle and a trailer (tractor-trailer combination) pressurized air and brake signals are supplied from the tractor vehicle to the trailer. Pressurized air is supplied to the trailer via a trailer supply line and pneumatic control signals are transmitted via a control line. For connecting the supply and control lines of a trailer, the pneumatic braking systems of the tractor vehicle usually has two coupling heads. Due to legal regulations in some states or regions, for example the USA, both coupling heads have to be of an open design, i.e. without check-valves. To prevent leakage when no trailer is connected to the coupling heads further measures are required. Therefore, the coupling heads are connected to a tractor protection valve, which protects the pneumatic braking system while no trailer is connected, during a trailer breakaway and/or when severe air leakage develops in the trailer.

In normal use the tractor protection valve is used to shut off the trailer control line before disconnecting the trailer from the pneumatic braking system of the vehicle. If the supply line to the tractor is disconnected in an emergency, the tractor protection valve closes and prevents leakage of air from a control line of the pneumatic braking system. Therefore, the pneumatic braking system of the tractor remains pressurized and retains its functionality. This function is required by law in the USA. Leakage from the supply line is usually prevented by a push-pull-valve or dash-valve. When being in a pushed position the dash valve allows pressurized air to flow from a pressurized air supply of the tractor to the air supply line of the trailer. When a pressure in the supply line of the tractor drops below a predefined threshold, the dash-valve pops out and closes off the supply of pressurized air to the trailer.

Pneumatic tractor protection valves are commonly used in commercial vehicles such as towing trucks and tractors. For example, the TP-3DC tractor protection valve of the manufacturer Bendix Commercial Vehicle Systems LLC from Elyria, Ohio, USA is known. This tractor protection valve is a purely pneumatic valve which is not configured to modulate the pressure supplied to the trailer. Control pressure at one of its inlets is supplied to the trailer control outlet as long as trailer supply pressure is supplied to the trailer. Since the TP-3DC tractor protection valve is a stand-alone unit assembly time and cost for a braking system including the stand-alone tractor protection valve is increased.

U.S. Pat. No. 8,297,713 B2 discloses a tractor protection valve receiving control pressure from a foot brake valve or hand control input and comprising a stability control mechanism having a solenoid. By electronically switching the solenoid a trailer service brake can be applied in response to a stability control signal by providing a control pressure equal to the supply pressure to the trailer service brake. However, the valve design is very complicated and a control pressure needs to be supplied manually from an external source. The tractor protection valve is not configured to modulate the trailer control pressure.

US 2020/0207319 A1 discloses an electropneumatic trailer supply module for an electropneumatic parking brake system for a tractor-trailer combination, including an air supply connection configured to connect a compressed air supply, a trailer supply connection configured to deliver a supply pressure for a trailer vehicle, a pneumatically controlled main valve unit configured to provide the supply pressure to the trailer supply connection, and an electropneumatic pilot control unit configured to select at least a first control pressure at the pneumatically controlled main valve unit. When the first control pressure exceeds a predefined first threshold value of the pneumatically controlled main valve unit, the supply pressure provided to the trailer supply connection can be selected. When the first control pressure falls below the predefined first threshold value of the pneumatically controlled main valve unit, the trailer supply connection is configured to be vented. However, the electropneumatic trailer supply module disclosed in US 2020/0207319 A1 is neither configured to provide a control pressure nor to provide a protection function for such a control pressure.

To achieve a higher accuracy in pressure control, for automation of the braking system and/or due to other reasons it is desirable to electronically control the control pressure supplied to the trailer, i.e. to modulate the control pressure based on electronic signals. However, due to legal regulations the tractor protection functionality needs to be ensured. Furthermore, there is a need for an economical system that uses cost-efficient components and that is easy to install into a braking system.

SUMMARY

In a first aspect to meet this objective, the present disclosure proposes an electropneumatic trailer control module of the aforementioned type characterized by a protection connection for receiving a pneumatic protection pressure, and a tractor protection unit comprising a tractor protection pilot port fluidically connected to the protection connection, wherein the tractor protection unit is configured to switch between a supply state and a protection state dependent on the pneumatic protection pressure, wherein the trailer control pressure is only provided to the trailer control connection when the tractor protection unit is in the supply state, and wherein the trailer control connection is connected to an exhaust when the tractor protection unit is in the protection state.

The tractor protection unit provides the tractor protection function required by law in some legislations. When in the protection state, the trailer control connection is connected to an exhaust. The exhaust may preferably be an opening to the environment, an exhaust line leading to such an opening and/or an exhaust equipped with an exhaust silencer. The trailer control connection is preferably connected to or forms a control coupling head (also referred to as "blue coupling head") for connecting a trailer control line (also referred to as "trailer service line") of the trailer. When the tractor protection unit is in the protection state, a control pressure circuit of the tractor vehicle is protected from leakage when the trailer is disconnected. The electropneumatic trailer control module connects the trailer control connection to the exhaust and thereby separates a control pressure circuit of the tractor and the control coupling head. In the supply state, the control pressure circuit is connected to the trailer control connection such that trailer control pressure can be provided to the trailer control line via the trailer control connection.

Whether the tractor protection unit is in the supply state or the protection state depends on the pneumatic protection pressure provided to the protection connection of the electropneumatic trailer control module. The protection connection is connected to the tractor protection pilot port. The electropneumatic trailer control module comprises at least four connections: the air supply connection, the trailer supply connection, the trailer control connection and the protection connection. Preferably, the protection connection and the air supply connection are separate connections. It is particularly preferred that the protection connection and the trailer supply connection are fluidically connected. Pressurized fluid (air) can then directly flow from the protection connection to the trailer supply connection and vice versa. It should be noted that the protection connection and the trailer supply are also fluidically connected when said connections are provided as a combined connection. A pressure supplied to the protection connection then equals a pressure supplied to the trailer supply connection. Consequently, also the pressure received at the tractor protection pilot port equals the pressure provided to the trailer supply connection. If during an emergency a trailer supply line is disconnected resulting in a pressure drop at the trailer supply connection the pressure provided to the tractor protection pilot port also drops (equally or proportionally). Preferably, the protection connection is connectable to an external control valve, particularly preferred to a dash valve. The external control valve is preferably configured to shut off a pressure supply if a pressure level downstream of the external control valve drops below a certain pressure threshold. Such external control valves which are often formed as dash valves are commonly used in pneumatic braking systems. In case of an emergency (e.g. in case of a trailer breakaway) the dash valves shuts of a pressure (air) supply to the protection connection and both the tractor protection pilot port as well as the trailer supply connection are disconnected from the supply. In this case, the tractor protection unit preferably switches to the protection state.

All connections of the electropneumatic trailer control module are preferably arranged on a housing of the electropneumatic trailer control module. However, not all of the connections need to be arranged on a housing of the electropneumatic trailer control module. As an alternative to all connections being arranged on the housing, the trailer supply connection and the protection connection are preferably arranged outside the housing. For example, the protection connection may be arranged outside the housing and connected to a manifold, wherein said manifold is connected to the tractor protection pilot port and the trailer supply connection. The electropneumatic trailer control valve arrangement may be directly or indirectly connected to the air supply connection. For example, a valve element may be arranged between the electropneumatic trailer control valve arrangement and the air supply connection.

Preferably, the electronic trailer control connection is or comprises an electric connection strip. The braking signals received at the electronic trailer control connection may be directly provided as trailer braking control signals or may be processed by the electropneumatic trailer control module. It is also preferred that only some signals are processed. Particularly preferred the electropneumatic trailer control module comprises an electronic control unit (ECU) for providing the trailer braking control signals.

In a first embodiment of the invention, the tractor protection unit is configured to switch to the protection state when the pneumatic protection pressure falls below a predetermined protection threshold and to switch to the supply state when the pneumatic protection pressure exceeds a predetermined supply threshold, wherein the supply threshold is preferably higher than the protection threshold. When the supply threshold is higher than the protection threshold, then a pressure needed for switching from the protection state to the supply state is higher than a pressure needed for switching from the supply state to the protection state. If during operation the pressure supplied to the protection connection falls below the supply threshold but remains above the protection threshold, the tractor protection unit remains in the supply state. Small pressure variations may therefore occur during operation without immediately causing the tractor protection unit to switch to the protection state. Safety and reliability can be increased. A pressure above the protection threshold and above the supply threshold is required to switch the tractor protection unit from the protection state to the supply state. This is beneficial since the tractor protection unit remains in the protection state even if the pressure provided to the protection connection briefly exceeds the protection threshold during an emergency. Overall reliability and/or safety provided by the electropneumatic trailer control module can be increased. Preferably, the protection threshold has a value in a range of 1 bar to 2.3 bar, preferably 1.2 bar to 2.1 bar, preferably 1.4 bar to 1.9 bar, preferably 1.5 bar to 1.9 bar, preferably 1.6 bar to 1.9 bar, preferably 1.7 bar to 1.9 bar, preferably 1.7 bar to 1.8 bar, particularly preferred about 1.77 bar. The supply threshold preferably has a value in a range of 2 bar to 3.5 bar, preferably 2 bar to 3.3 bar, preferably 2.2 bar to 3.3 bar, preferably 2.2 bar to 3 bar, preferably 2.4 bar to 3 bar, preferably 2.4 bar to 2.8 bar, preferably 2.5 bar to 2.8 bar, particularly preferred about 2.65 bar.

Preferably, the tractor protection unit comprises a pneumatically controlled tractor protection valve having the tractor protection pilot port, a tractor protection working port, a tractor protection inlet port and a tractor protection exhaust port fluidically connected to the exhaust. The exhaust may be a common exhaust of the electropneumatic trailer control module or an individual exhaust of the tractor protection valve. The tractor protection valve preferably is a pneumatically controlled 3/2-way valve. Preferably, the tractor protection unit consists of the tractor protection valve.

According to a preferred embodiment, the tractor protection inlet port is fluidically connected to a working port of the electropneumatic trailer control valve arrangement for receiving the trailer control pressure and the tractor protection working port is fluidically connected to the trailer control connection. The trailer protection valve is then arranged downstream of the electropneumatic trailer control valve arrangement, when a positive pressure is supplied to the trailer control connection. A supply pressure is provided to the electropneumatic trailer control valve, which then provides the trailer control pressure based on the trailer braking control signals to the tractor protection inlet port. In one embodiment, the tractor protection inlet port is directly connected to a working port of an electropneumatic pilot control unit of the electropneumatic trailer control valve arrangement. In another embodiment, the tractor protection inlet port is connected to a relay valve working port of a relay valve of a main valve unit of the electropneumatic trailer control valve arrangement. The tractor protection working port is directly or indirectly fluidically connected to the trailer control connection such that the trailer control pressure is supplied to the trailer control connection via the tractor protection valve when the tractor protection unit is in the supply state. When in the protection state, the trailer control connection is connected to the exhaust and the tractor protection inlet port is closed off.

In an alternative embodiment, the tractor protection inlet port is fluidically connected to the air supply connection and the tractor protection working port is fluidically connected to a control valve supply port of the electropneumatic trailer control valve arrangement. In the protection state, the tractor protection valve then blocks supply of supply pressure to the electropneumatic trailer control valve arrangement which consequently cannot provide a trailer control pressure to the trailer control connection.

It is further preferred that the electropneumatic trailer control valve arrangement comprises an electropneumatic pilot control unit configured to provide a first pilot control pressure and a pneumatically controlled main valve unit configured to receive the first pilot control pressure and to provide a trailer control pressure dependent on the first pilot control pressure. Preferably, the pilot control unit comprises a first electropneumatic control valve configured to receive a supply pressure and to provide the pilot control pressure, preferably via a first control valve working port, dependent on one or more trailer braking control signals provided to the first electropneumatic control valve by the electronic trailer control connection. The first electropneumatic control valve is preferably a solenoid valve. It is further preferred that the first electropneumatic control valve is an electropneumatic 2/2-way valve. The pneumatically controlled main valve unit preferably comprises a relay valve configured to receive the first pilot control pressure as well as a supply pressure and to provide the trailer control pressure dependent on the first pilot control pressure. It is further preferred that the electropneumatic pilot control unit comprises a bleed valve for connecting the first control valve working port of the first electropneumatic control valve to an exhaust.

In a preferred embodiment, the electropneumatic trailer control module further comprises a redundancy connection for receiving a redundancy pressure, wherein the electropneumatic trailer control module is configured to provide a trailer control pressure to the trailer control connection dependent on the redundancy pressure, when the electropneumatic trailer control valve arrangement is de-energized and/or is defective. The redundancy connection is preferably configured to be connected to a front axle brake circuit and/or a rear axle brake circuit of a tractor vehicle for receiving a respective front axle brake pressure and/or rear axle brake pressure as the redundancy pressure. Preferably, the first electropneumatic control valve is configured to automatically switch to a closed position when de-energized and/or defective. The electropneumatic trailer control module preferably comprises a redundancy valve having a redundancy inlet port connected to the redundancy connection and a redundancy working port connected to the main valve unit for providing a redundancy pilot pressure to the main valve unit. In this case, the main valve unit provides a trailer control pressure proportional to the redundancy pressure. Preferably, the redundancy valve is an electropneumatic redundancy valve. When de-energized and/or defective, the redundancy valve is preferably configured to switch to a redundancy position fluidically connecting the redundancy connection and the redundancy working port.

Preferably, the pneumatically controlled tractor protection valve of the electropneumatic trailer control module comprises a tractor protection control piston slidably arranged in a cylinder between a protection position and a supply position, the tractor protection control piston comprising an internal channel having an exhaust opening fluidically connected to the tractor protection exhaust port and a second opening in an end portion of the tractor protection control piston, wherein the tractor protection working port is fluidically connected to the tractor protection exhaust port via the internal channel when the tractor protection control piston is in the protection position, and wherein the internal channel is closed and the tractor protection working port is fluidically connected to tractor protection inlet port when the tractor protection control piston is in the supply position. In this embodiment, the switching function of the tractor protection unit is at least partially provided by the tractor protection control piston of the tractor protection valve. Through this, a particularly robust, cheap and simple tractor protection function is achieved. Preferably, the pneumatically controlled tractor protection valve further comprises a biasing member arranged on a first side of the tractor protection control piston for biasing the control piston into the protection position. The biasing member than automatically pushes the control piston into the protection position when a force provided by the biasing member exceeds a respective counter force on the piston.

It is preferred that the pneumatically controlled tractor protection valve further comprises a protection control chamber arranged on a second side of the tractor protection control piston opposite the first side, wherein the protection control chamber is fluidically connected to the tractor protection pilot port and the tractor protection control piston is movable from the protection position to the supply position by providing pressurized air at an opening pressure to the protection control chamber. Preferably, the protection control chamber is directly connected to the tractor protection pilot port such that pressure provided to the control chamber substantially equals a pressure provided to the tractor protection pilot port. The opening pressure required for moving the tractor protection control piston to the supply position is preferably equal to or exceeds the supply threshold. Preferably, the force provided by the biasing member at least partially defines the difference between the supply threshold and the protection threshold. For moving the tractor protection control piston to the supply position, a pressure force on the tractor protection control piston resulting from the opening pressure needs to work against the biasing force provided by the biasing member. In contrast to the that, the biasing member helps moving the tractor protection control piston to the protection position such that a smaller pressure difference between the first side and the second side of the piston is enough to move the piston.

In a further preferred embodiment, the pneumatically controlled tractor protection valve further comprises a sealing valve member movably arranged between a connection position wherein a sealing surface of the sealing valve member is separated from a valve seat of the sealing valve member such that the tractor protection inlet port and the tractor protection working port are fluidically connected and a separating position wherein the sealing surface abuts the valve seat for separating the tractor protection inlet port from the tractor protection working port, wherein the sealing valve member is in the connection position when the tractor protection control piston is in the supply position, and wherein the sealing valve member is in the separating position when the tractor protection control piston is in the protection position. The tractor protection control piston may be configured to actuate the sealing valve member.

Preferably, the end portion of the tractor protection control piston is configured to abut the sealing valve member for moving the sealing valve member from the separating position to the connection position when the tractor protection control piston is moved to the supply position. The second opening of the internal channel is preferably closed by the sealing valve member when the end portion abuts the sealing valve member. In this case the sealing valve member closes the internal channel when the tractor protection control position is in an at least partially open state (i.e. when the piston is at least partially moved to the supply position). In the connection position, the sealing valve member closes the internal channel while it blocks the fluidic connection between the tractor protection inlet port and the tractor protection working port when in the separating position.

According to a second aspect of the invention, the above stated problem is solved by an electropneumatic braking system for a tractor vehicle of a tractor-trailer combination, in particular a commercial-vehicle combination, comprising at least a first brake circuit including brake actuators for braking the tractor vehicle, one or more compressed air supplies, and a trailer control circuit comprising a supply coupling head, a control coupling head, an electropneumatic trailer control module and an external control valve, in particular dash valve; wherein the external control valve is connected to a compressed air supply of the one or more compressed air supplies; the air supply connection of the electropneumatic trailer control module is connected to a compressed air supply of the one or more compressed air supplies, the trailer supply connection of the electropneumatic trailer control module is connected to a supply coupling head; the trailer control connection of the electropneumatic trailer control module is connected to the control coupling head; and the protection connection of the electropneumatic trailer control module is connected to the external control valve. The air supply connection of the electropneumatic trailer control module and the external control module may be connected to the same compressed air supplies of the electropneumatic braking system or to one or more different air supplies. For example, the air supply connection and the external control valve may both be connected to a first air supply while only the external control valve is connected to a second air supply. However, it should be noted that the air supply connection is not in direct fluid communication with the external control valve. Preferably, supply pressure is provided to the electropneumatic trailer control module via the air supply connection and, if the external control valve is open, via the external control valve to the protection connection. The external control valve is preferably arranged in direct fluid communication with the protection connection and the trailer supply connection. The trailer control connection may however be arranged between the trailer supply connection and the external control valve even if the external control valve is in direct fluid communication with the trailer supply connection. Preferably, the first brake circuit is a rear axle brake circuit.

According to a third aspect of the invention, the above stated problem is solved by a method for controlling a trailer supply function of an electropneumatic braking system of a tractor vehicle of a tractor-trailer combination, preferably an electropneumatic braking system according to the second aspect of the invention, comprising the steps of: supplying a supply pressure to an air supply connection of an electropneumatic trailer control module of the electropneumatic braking system; receiving the supply pressure at an electropneumatic trailer control valve arrangement of the electropneumatic trailer control module; providing a trailer control pressure by the electropneumatic trailer control valve arrangement, receiving a pneumatic protection pressure at a protection connection of the electro-pneumatic trailer control module; switching a tractor protection unit of the electropneumatic trailer control module in a supply state and providing the trailer control pressure to a trailer control connection of the electropneumatic trailer control module when the pneumatic protection pressure received at the protection connection exceeds a predetermined supply threshold; and switching the tractor protection unit in a protection state and connecting the trailer control connection to an exhaust when the pneumatic protection pressure falls below a protection threshold.

In a first preferred embodiment, the method further comprises the step: providing the trailer control pressure to the trailer control connection when the pneumatic protection pressure falls below the supply threshold but exceeds the protection threshold.

Preferably, the method further comprises the steps of: supplying a trailer supply pressure to a trailer supply connection of the electropneumatic trailer control module. It is preferred that the method further comprises the steps: providing supply pressure to an external control valve, and supplying the protection pressure at the protection connection by the external control valve. According to a particularly preferred embodiment, the step of supplying a trailer supply pressure to a trailer supply connection of the electropneumatic trailer control module comprises supplying protection pressure to the protection connection from the external control valve and supplying the trailer supply pressure to the trailer supply connection via the protection connection.

According to a fourth aspect of the invention, the above stated problem is solved a tractor vehicle of a tractor-trailer combination, in particular commercial-vehicle combination, comprising an electropneumatic braking system according to the second aspect of the invention. It should be understood that the electropneumatic braking system according to the second aspect of the invention, the method according to the third aspect of the invention, the tractor vehicle according to the fourth aspect of the invention and the electropneumatic trailer control module according to the first aspect of the invention preferably have similar or equal aspects. Thus, reference is made to the above description of the electropneumatic trailer control module according to the first aspect of the invention.

For a more complete understanding of the invention, the invention will now be described in detail with reference to the accompanying drawings. The detailed description will illustrate and describe what is considered as preferred embodiments of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein. Further, features disclosed in the description or the drawings may constitute inventions individually or in combination. The wording "comprising" or "including" does not exclude other elements or steps. The word "a" or "an" does not exclude the plurality. The wording "a number of" items comprising also the number 1, i.e. a single item, and further numbers like 2, 3, 4 and so forth. The use of the word "or" indicates alternatives among the elements grouped by the conjunction "or" as well as combinations thereof.

BRIEF DESCRIPTION OF THE DRAWINGS

In the accompanying drawings.

DETAILED DESCRIPTION OF THE DRAWINGS

Figure 1:
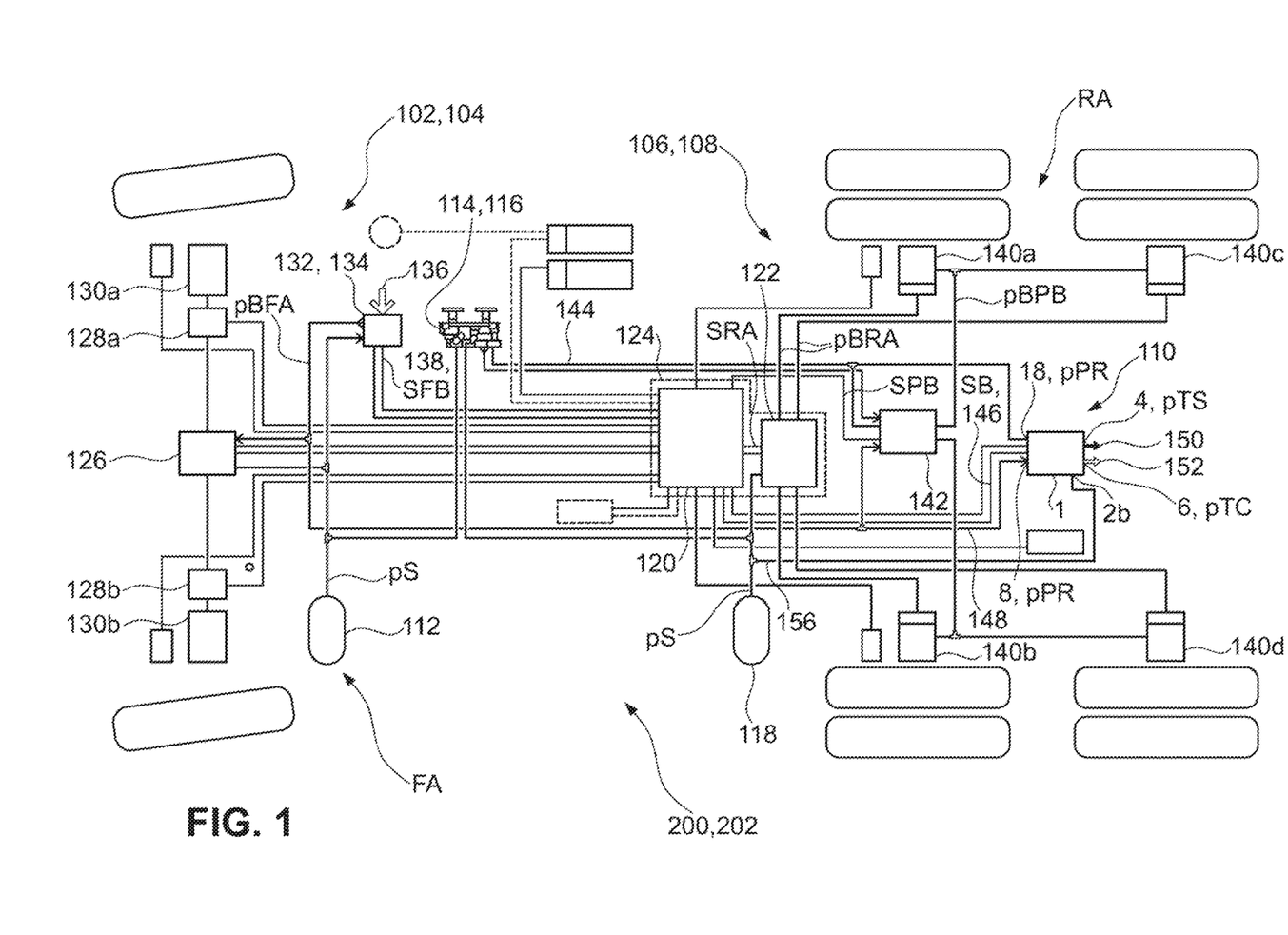
FIG. 1 shows a schematic layout of a vehicle having an electropneumatic braking system.

A tractor vehicle 200, in particular a commercial vehicle 202, comprises a front axle FA and a rear axle RA. The vehicle 200 is a tractor vehicle of a tractor-trailer combination (trailer not shown). For braking the front axle FA and the rear axle RA the tractor vehicle 200 comprises an electropneumatic braking system 100.

The electropneumatic braking system 100 comprises a first brake circuit 102, which here is a front axle brake circuit 104 for the front axle FA, and a second brake circuit 106, which here is a rear axle brake circuit 108 for the rear axle RA. Furthermore, the electropneumatic braking system 100 comprises a trailer control circuit 110. For providing compressed air at a supply pressure pS, the electropneumatic braking system 100 comprises a first compressed air supply 112. In this embodiment the first compressed air supply 112 supplies the first brake circuit 102 and provides air to an external control valve 114 which is formed as a dash valve 116. The second brake circuit 106 is supplied by a second compressed air supply 118, which also provides compressed air at the supply pressure pS. Here, the dash valve 116 is fluidically connected to the second compressed air supply 118. However, it is also preferred that the first compressed air supply 112 or the second compressed air supply 118 supplies the first or second brake circuit 102, 106, only. Compressed air is provided to the first and second compressed air supplies 112, 118 by an air treatment system, which is not shown.

The electropneumatic braking system 100 includes a main electronic control unit 120, which is also referred to as mECU, for controlling its elements. The mECU in particular controls a rear axle modulator 122 provided for the rear axle RA. In this embodiment the rear axle modulator 122 and mECU 120 are formed as a control unit 124. A front axle modulator 126 is connected to first and second front axle ABS-modules 128a, 128b which in turn are connected to front axle brake actuators 130a, 130b. The front axle modulator 126 is pneumatically connected to a foot brake module 132. In this embodiment the foot brake module 132 is formed as an electropneumatic foot brake module 134. Upon actuation (represented by arrow 136) by a user or upon electronic actuation by an actuator (not shown) the foot brake module 134 provides a front axle braking pressure pBFA to the front axle modulator 126.

The foot brake module 132 is further connected to the mECU 120 via a foot brake signal line 138. Upon actuation the foot brake module 132 provides foot brake signals SFB proportional to the actuation. The mECU 120 provides rear axle brake signals SRA to the rear axle modulator 122 which then provides a corresponding rear axle braking pressure pBRA to rear axle brake actuators 140a, 140b, 140c, 140d of the rear axle RA. The rear axle brake actuators 140a, 140b, 140c, 140d are formed as tristop-cylinders providing a service braking function as well as a park braking function. When the rear axle braking pressure pBRA is supplied to the rear axle brake actuators 140a, 140b, 140c, 140d the tristop-cylinders are closed for braking the rear axle RA. The parking brake portion of the rear axle brake actuators 140a, 140b, 140c, 140d is configured for braking the rear axle RA of the vehicle 200 in a non-pressurized state. During a drive of the vehicle 200 a park braking pressure pBPB is supplied to the rear axle brake actuators 140a, 140b, 140c, 140d. When the park braking pressure pBPB is supplied spring elements (not shown) of the rear axle brake actuators rear axle brake actuators 140a, 140b, 140c, 140d are opened an the rear axle RA is ready for driving.

The park braking pressure pBRP is provided to the rear axle brake actuators 140a, 140b, 140c, 140d by a park brake module 142 which is in fluid communication with the external control valve 114 via protection line 144. The park brake module 142 receives park brake signals SPB from the mECU 120 and provides the park braking pressure pBPB.

Protection line 144 is further connected to an electropneumatic trailer control module 1 of the trailer control circuit 110. For receiving braking signals SB the electropneumatic trailer control module 1 is connected to the mECU 120 via brake signal line 146. Furthermore, the electropneumatic trailer control module 1 is connected to the foot brake module 132 via redundancy line 148 for receiving a redundancy pressure pBR. In particular the redundancy line 148 is connected to a redundancy connection 8 of the electropneumatic trailer control module 1. In this embodiment the redundancy pressure pBR equals the front axle braking pressure pBFA.

The electropneumatic trailer control module 1 is further connected to a supply coupling head 150 and a control coupling head 152. According to SAE International's standard J318 the control coupling head 152 is usually referred to as blue coupling head while the supply coupling head 150 is referred to as red coupling head. The supply coupling head 150 is connected to a trailer supply connection 4 of the electropneumatic trailer control module 1 for delivering a trailer supply pressure pTS to the trailer via the supply coupling head 150. The control coupling head 152 is connected to a trailer control connection 6 of the electropneumatic trailer control module 1 for providing a trailer control pressure pTC to the trailer via the control coupling head 152. An air supply connection 2b of the electropneumatic trailer control module 1 is connected to the second compressed air supply 118 via a second supply line 156. In this embodiment the electropneumatic trailer control module 1 further comprises an air supply connection 2a fluidically connected to the first compressed air supply 112 via a first supply line 154 (not shown in FIG. 1). A protection connection 10 of the electropneumatic trailer control module 1 is connected to the protection line 144 coming from the dash valve 116 for receiving a protection pressure pPR.

When the external control valve 114 is in an external supply state (in general a pushed position if the external control valve 114 is a push-pull valve), then air at supply pressure pS is supplied to the protection line 144 from the first air supply 112 and/or the second compressed air supply 118 via the external control valve 114. In a closed state of the external control valve 114 (in general a pulled position) air flow from the first compressed air supply 112 and the second compressed air supply 118 to the control line 144 is blocked by the external control valve 114. The external control valve 114 is further configured to switch from the external supply state to the closed state when a pressure in the protection line 144 drops below a predefined pressure level. If, for example, due to a failure in the protection line 144 or an unintended trailer breakaway, a pressure level in the protection line 144 drops below a the predefined pressure level, the external control valve 114 automatically blocks the fluid connection of the protection line 144 to the first compressed air supply 112 and the second compressed air supply 118 (the push-pull valve pops out). Thereby a supply of supply pressure pS to the front axle brake circuit 104 and the rear axle brake circuit 108 of the tractor vehicle 200 is ensured.

Figure 2:
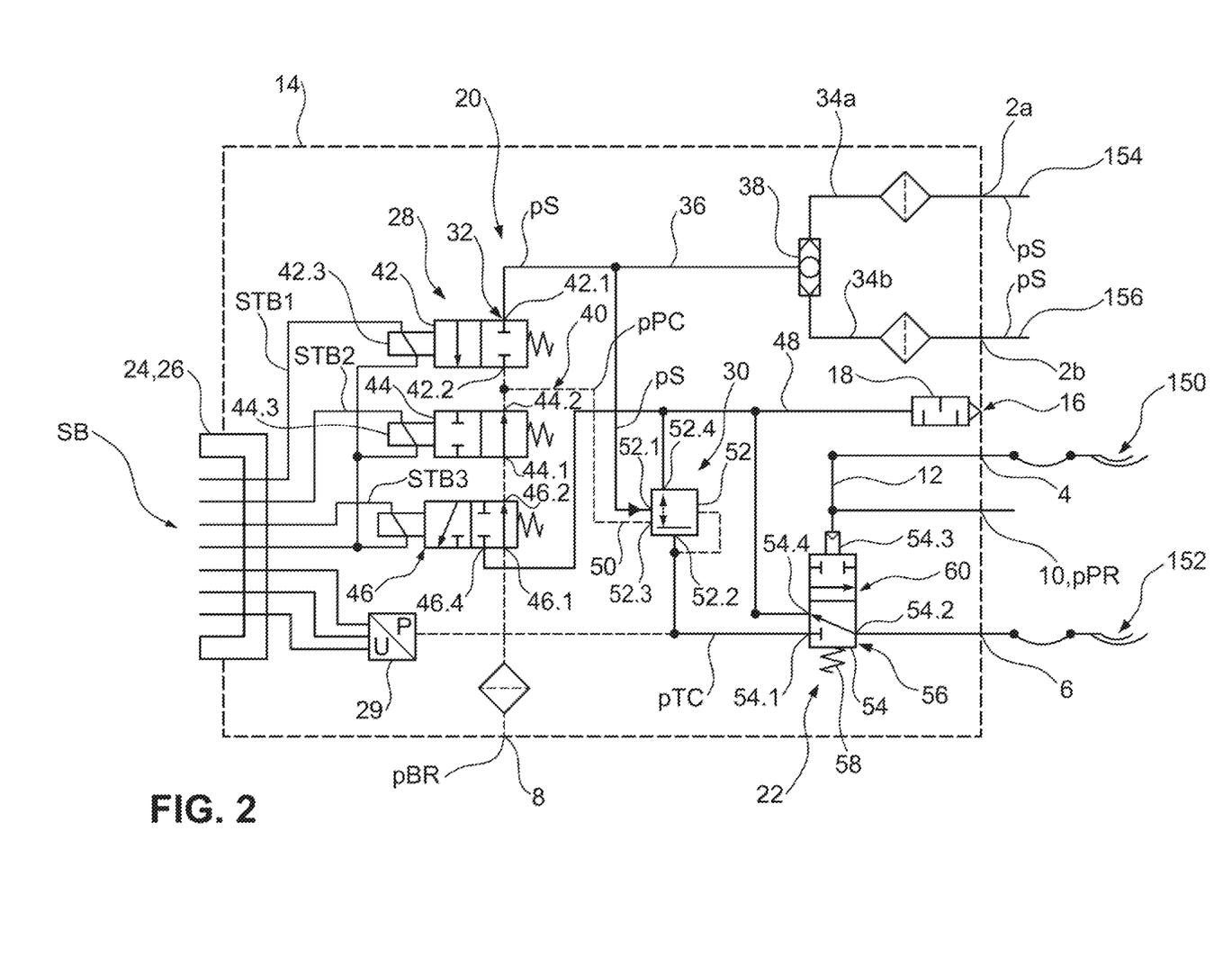
FIG. 2 shows an electropneumatic trailer control module according to a first embodiment.

The electropneumatic trailer control module 1 will now be described in further detail with regard to FIGS. 2 and 3. FIG. 2 schematically shows a first embodiment of the electropneumatic trailer control module 1 having the air supply connections 2a, 2b connected to the supply lines 154, 156. As described above the trailer supply connection 4 of the electropneumatic trailer control module 1 is connected to the supply coupling head 150 and the trailer control connection of the electropneumatic trailer control module 1 is connected to the control coupling head 152. The protection connection 10 is in direct fluid communication with the trailer supply connection 4 via a protection pilot line 12. The trailer supply connection 2, the trailer control connection 6, the protection connection 10 and the redundancy connection 8 are arranged on a housing 14 of the electropneumatic trailer control module 1. The housing 14 further comprises an exhaust 16 connected to an exhaust silencer 18.

An electropneumatic trailer control valve arrangement 20 and a tractor protection unit 22 are arranged inside the housing 14. Additionally the electropneumatic trailer control module 1 comprises an electronic trailer control connection 24 connected to the brake signal line 146 for receiving the braking signals SB. In this embodiment, the electronic trailer control connection 24 is formed as an electric connection strip 26 directly supplying trailer braking control signals STB to the electropneumatic trailer control valve arrangement. The electronic trailer control connection 24 is further connected to a pressure sensor 29 for receiving sensor signals SS and for providing the sensor signals SS to the mECU 120. However, the electronic trailer control connection 24 may also comprise an ECU for providing the trailer braking control signals STB and for receiving the sensor signals SS.

The electropneumatic trailer control valve arrangement 20 comprises an electropneumatic pilot control unit 28 and a pneumatically controlled main valve unit 30. A control valve supply port 32 of the electropneumatic pilot control unit 28 is in direct fluid communication with the air supply connections 2a, 2b via primary supply lines 34a, 34b and a secondary supply line 36. A check valve 38 is arranged between the primary supply lines 34a, 34b and the secondary supply line 36 such that the higher pressure of pressures provided to the air supply connection 2a and 2b respectively is provided to the secondary supply line 36. During normal operation supply pressure pS is provided to the control valve supply port 32. The electropneumatic pilot control unit 28 is configured to receive the supply pressure pS via the control valve supply port 32 and to provide a first pilot control pressure pPC at a pilot control working port 40 of the electropneumatic pilot control unit 28. The pilot control pressure pPC can be modulated by the electropneumatic pilot control unit 28 dependent on the trailer braking control signals STB provided by the electronic trailer control connection 24. For this purpose, the electropneumatic pilot control unit 28 comprises a first electropneumatic control valve 42 having a first electropneumatic supply port 42.1 and a first electropneumatic working port 42.2. In this embodiment, the first electropneumatic supply port 42.1 functions as the control valve supply port 32 while the first electropneumatic working port 42.2 is in direct fluid communication to the pilot control working port 40. The first electropneumatic control valve 42 is an electronically controlled 2/2-way valve biased in a closed position (shown in FIG. 2), wherein the first electropneumatic supply port 42.1 and the first electropneumatic working port 42.2 are separated. A first solenoid 42.3 of the first electropneumatic control valve 42 can be energized by the trailer braking control signals STB1 such that a modulated first pilot control pressure pPC can be provided at the first electropneumatic working port 42.2 by gradually opening or closing the first electropneumatic control valve 42.

The electropneumatic pilot control unit 28 further comprises a second electropneumatic control valve 44 and a third electropneumatic control valve 46 (bleed valve). The second electropneumatic control valve 44 is formed as an electropneumatic 2/2-way valve that is biased to a closed position connecting a second electropneumatic supply port 44.1 and a second electropneumatic working port 44.2 of the second electropneumatic control valve 44. When trailer braking control signals STB2 are provided to a second solenoid the second electropneumatic control valve 44 is closed and a fluid passage between the second ports 44.1, 44.2 is blocked. The second electropneumatic working port 44.2 is in fluid communication with the pilot control working port 40 while the second electropneumatic supply port 44.1 is connected to a third electropneumatic working port 46.2 of the third electropneumatic control valve 46. The third electropneumatic control valve 46 is formed as an electropneumatic 3/2-way valve. A third electropneumatic supply port 46.1 of the third electropneumatic control valve 46 is connected to the redundancy connection 8 for receiving the redundancy pressure pBR. A third exhaust port 46.4 of the third electropneumatic control valve 46 is connected to the exhaust 16. The third electropneumatic control valve 46 is biased in a supply position (shown in FIG. 2) when the third electropneumatic control valve 46 is de-energized. By providing trailer braking control signals STB to a third solenoid 46.3, the third electropneumatic control valve 46 can be switched to an exhaust position wherein the third electropneumatic working port 46.2 is connected to the exhaust 16.

In this embodiment, the electropneumatic pilot control unit 28 of the electropneumatic trailer control valve arrangement 20 comprises the first electropneumatic control valve 42, the second electropneumatic control valve 44 and the third electropneumatic control valve 46. However, in other embodiments the electropneumatic pilot control unit 28 may also comprise more or less than three control valves. For example, the electropneumatic pilot control unit 28 could only comprise the first electropneumatic control valve 42 and the third electropneumatic control valve 46.

For providing the first pilot control pressure pPC during normal operation, trailer braking control signals STB1, STB2 are provided and the electropneumatic pilot control unit 28 functions as follows: Upon reception of the trailer braking control signals STB2 the second solenoid 44.3 switches the second electropneumatic control valve 44 from the open position shown in FIG. 2 to the closed position such that a fluid passage between the second electropneumatic supply port 44.1 to the second electropneumatic working port 44.2 and vice versa is blocked. The first electropneumatic control valve 42 receives supply pressure pS at its first electropneumatic supply port 42.1. Upon reception of the trailer braking control signals STB1 at the first solenoid 42.3, the first electropneumatic control valve 42 modulates the pressure such that the pilot control pressure pPC corresponding to the trailer braking control signal STB1 is supplied to the first electropneumatic working port 42.2 and (due to the direct fluidal connection) to the pilot control working port 40. In order to vent the pilot control working port 40, the first electropneumatic control valve 42 and the second electropneumatic control valve 44 are de-energized such that the first electropneumatic control valve 42 switches to the closed position shown in FIG. 2 and the second electropneumatic control valve 44 switches to the open position shown in FIG. 2. At the same time the third electropneumatic control valve 46 is energized by providing third trailer braking control signals STB3 to the third electropneumatic control valve 46 such that it switches from the supply position (shown in FIG. 2) to the exhaust position. The pilot control working port 40 is then fluidically connected to the exhaust 16 via the second electropneumatic control valve 44, the third electropneumatic control valve 46, an exhaust line 48 and the exhaust silencer 18.

The electropneumatic trailer control module 1 further provides a fail-safe functionality. If no trailer braking control signals STB can be provided during an electrical failure, the electropneumatic control valves 42, 44, 46 of the electropneumatic pilot control unit 28 switch to the positions shown in FIG. 2. The first electropneumatic control valve 42 is closed while the second electropneumatic control valve 44 is open and the third electropneumatic control valve 46 is in the supply position wherein the third electropneumatic supply port 46.1 and the third electropneumatic working port 46.2 are in fluid communication. Redundancy pressure pBR provided to the redundancy connection 8 is then supplied to the pilot control working port 40 via the third electropneumatic control valve 46 and the second electropneumatic control valve 44 while a fluid passage from the air supply connections 2a, 2b is blocked by the first electropneumatic control valve 42.

The pilot control working port 40 is connected to the main valve unit 30 via pilot control line 50. In this embodiment, the main valve unit 30 consists of a pneumatic relay valve 52, wherein a control signal directed to a relay valve control port 52.3 of the relay valve 52 is a pneumatic control signal. However, it should be noted that the main valve unit 30 may also comprise a valve of another valve type or additional valves. The pilot control pressure pPC provided by the electropneumatic pilot control unit 28 via the pilot control line 50 forms the control signal of the relay valve 52. The relay valve 52 further comprises a relay valve supply port 52.1, a relay valve working port 52.2 and a relay valve exhaust port 52.4. Supply pressure pS is provided to the relay valve supply port 52.1 via the air supply connections 2a, 2b, the primary supply lines 34a, 34b, the check valve 38, and the secondary supply line 36. The relay valve 52 modulates the supply pressure pS of compressed air supplied to the relay valve supply port 52.1 such that a trailer control pressure pTC provided at the relay valve working port 52.2 equals the pressure supplied to the relay valve control port 52.3 (the pilot control pressure pPC or the redundancy pressure pBR). It shall be understood that substantially no air flow occurs from the relay valve control port 52.3 to the relay valve working port 52.2. The pressure supplied to the relay valve control port 52.3 only controls the pressure level at the relay valve working port 52.2. Thus, if no compressed air is supplied to the relay valve supply port 52.1 and/or if the relay valve control port 52.3 is fluidically connected to the exhaust 16, no trailer control pressure pTC is supplied at the relay valve working port 52.2.

In this embodiment, the tractor protection unit 22 comprises a pneumatically controlled tractor protection valve 54 that is arranged between the relay valve working port 52.2 and the trailer control connection 6. The tractor protection valve 54 is formed as a pneumatic 3/2-way valve having a tractor protection inlet port 54.1, a tractor protection working port 54.2, a tractor protection pilot port 54.3 and a tractor protection exhaust port 54.4. The tractor protection pilot port 54.3 of the tractor protection valve 54 is connected to the protection connection 10 for receiving the protection pressure pPR as a pneumatic control signal. The tractor protection valve 54 is a monostable valve that is biased in a protection state 56 shown in FIG. 2 by a spring 58. In the protection state 56 the tractor protection working port 54.2 is connected to the tractor protection exhaust port 54.4 such that the trailer control connection 6 is in fluid communication with the exhaust 16. Thereby air leakage from the electropneumatic trailer control valve arrangement 20 is prevented, when the tractor protection unit 22 is in the protection state 56.

When the protection pressure pPR supplied to the protection connection 10 and to the tractor protection pilot port 54.3 respectively exceeds a supply threshold TS the tractor protection valve 54 switches to a supply state 60, wherein the tractor protection inlet port 54.1 and the tractor protection working port 54.2 are connected such that the trailer control pressure pTC supplied by the electropneumatic trailer control valve arrangement 20 is supplied to the trailer control connection 6 via the tractor protection valve 54. For venting the trailer control connection 6 during normal operation the tractor protection valve can remain in the supply state 60. The trailer control connection 6 is then vented via the relay valve 52, by connecting the relay valve control port 52.3 to the exhaust via the electropneumatic pilot control unit 28 such that the relay valve working port 52.2 is connected to the relay valve exhaust port 52.4.

Figure 3:
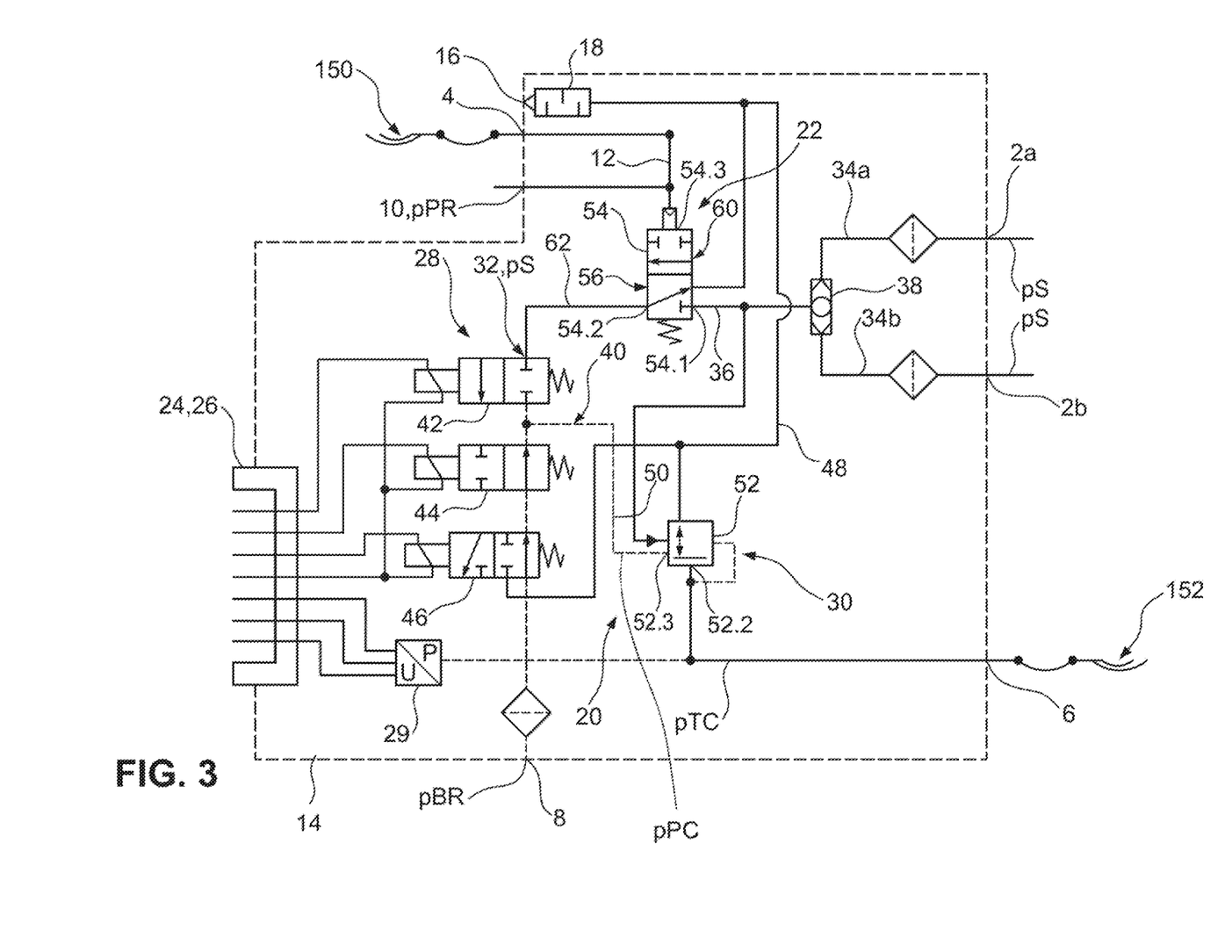
FIG. 3 shows an alternative second embodiment of the electropneumatic trailer control module.

FIG. 3 shows a second embodiment of the electropneumatic trailer control module, wherein identical or similar elements are provided with identical or similar reference signs unless otherwise noted. In the second embodiment the tractor protection unit 22, in particular the tractor protection valve 54, is arranged between the air supply connections 2a, 2b and the electropneumatic trailer control valve arrangement 20. The trailer control connection 6 is directly connected to the relay valve working port 52.2 for providing the trailer control pressure pTC to the control coupling head 152. In contrast to the first embodiment of the electropneumatic trailer control module 1 the tractor protection valve 54 controls supply of supply pressure pS to the control valve supply port 32 of electropneumatic trailer control valve arrangement 20. Supply pressure pS is only provided to the control valve supply port 32 if the tractor protection unit 22 is in the supply state 60 such that the secondary supply line 36 is in fluid communication with a tertiary supply line 62 connected to the tractor protection working port 54.2. If the protection pressure pPR provided to the tractor protection pilot port 54.3 via the protection connection 10 falls below a protection threshold TP the tractor protection valve 54 switches to the protection state 56 such that not supply pressure pS is provided to the electropneumatic trailer control valve arrangement 20. In this case the electropneumatic pilot control unit 28 may only supply the redundancy pressure pBR provided to the redundancy connection 8 to the relay valve control port 52.3 of the main valve unit 30. Thereby a fail-safe operation is ensured if the electropneumatic pilot control unit 28 is de-energized due to an electrical failure. During normal operation, a trailer control pressure pTC is only provided to the trailer control connection 6 if the tractor protection unit 22 is in the supply state 60, i.e. when the protection pressure pPR has exceeded the supply threshold TS and has not fallen below the protection threshold TP afterwards. It should be noted that the exhaust line 48 is not connected to the secondary supply line 36.

In the first embodiment of the electropneumatic trailer control module 1 both the trailer control pressure pTC as well as the redundancy pressure pBR are protected by the tractor protection unit 22. If, for example, a trailer supply line is ripped off from a tractor vehicle 200 during an incident, the supply coupling head 150 is connected to the environment. Consequently a pressure in the protection pilot line 12 and at the tractor protection pilot port 54.3 drops below the protection threshold TP such that the tractor protection valve 54 switches to the protection state 56. The tractor protection valve 54 then connects the control connection 6 and the coupling head 152 to the exhaust 16 and leakage of air from the electropneumatic braking system 100 of the tractor vehicle 200 is prevented. Since the trailer supply connection 4 is in direct fluid communication with the protection connection 10, a pressure level in the protection line 144 also drops to an environmental pressure level. In this case, the dash valve 116 automatically closes the connection between the first compressed air supply 112 and the second compressed air supply 118 to the protection line 144 and thereby protects the front axle brake circuit 104 and the rear axle brake circuit 108 from excess leakage.

In the second embodiment only the trailer control pressure pTC is protected by the tractor protection unit 22. During an emergency, a redundancy pressure pBR may then still be supplied to the trailer control connection 6. In order, to prevent leakage from the front axle brake circuit 104 if both the supply coupling head 150 and the control coupling head 152 are open to the environment, the third electropneumatic control valve 46 needs to be energized.

Figure 4:
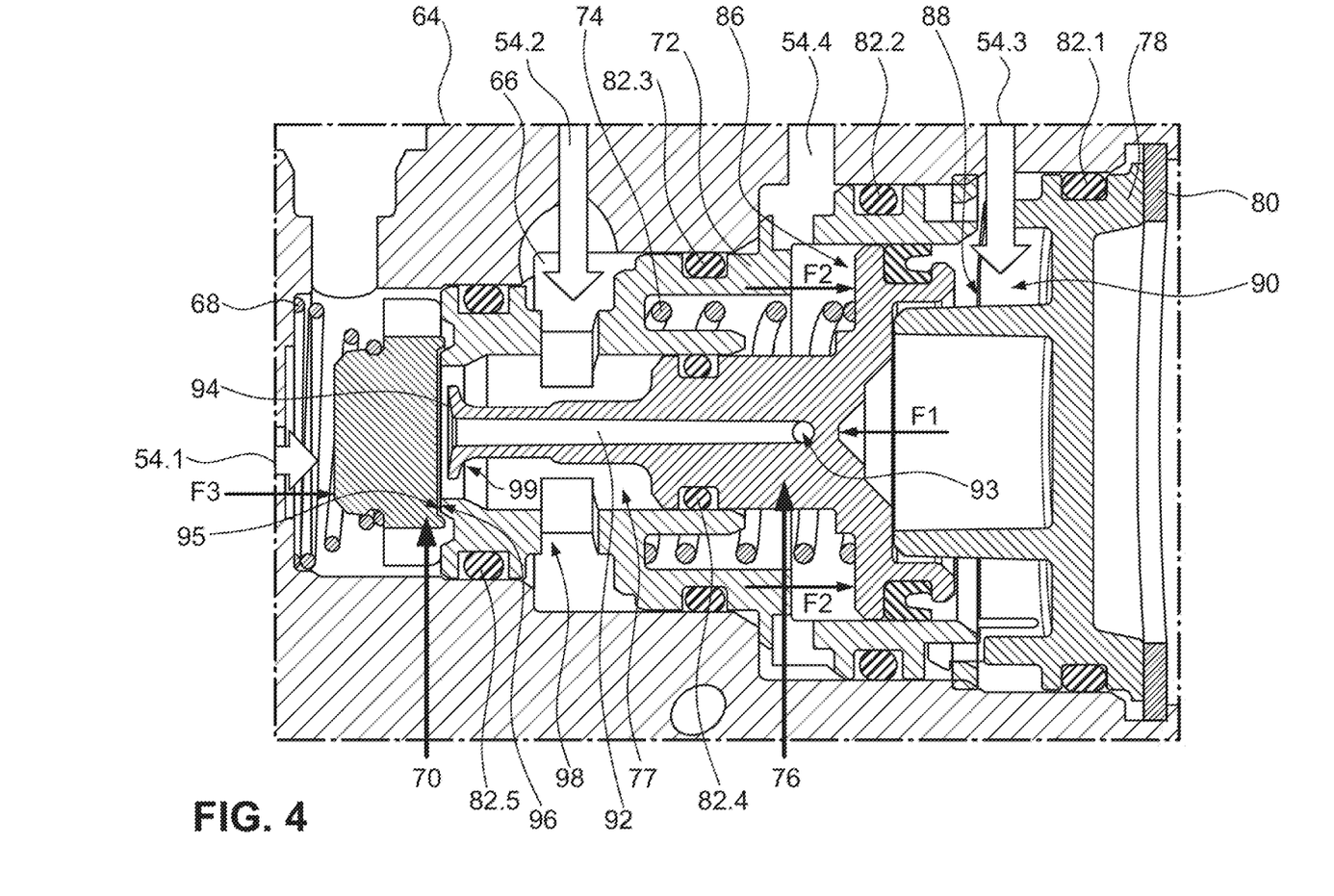
FIG. 4 shows a cut view of a tractor protection valve.

FIG. 4 shows a cut view of a tractor protection valve having a valve body 64 in which the tractor protection inlet port 54.1, the tractor protection working port 54.2, the tractor protection pilot port 54.3 and the tractor protection exhaust port 54.4 are formed. A main valve cavity 66 having a stepped profile is arranged in the valve body 64, wherein an assembly opening connects a biggest portion 66.1 of the valve cavity 66 to the surrounding. Starting from a smallest portion 66.2 to the biggest portion 66.1 the following elements are arranged in the valve cavity 66: a sealing valve spring 68, a sealing valve member 70, a guide element 72, a piston spring 74, a tractor protection control piston 76, a closure member 78 and a retaining ring 80. To prevent leakage of pressurized air from the valve cavity 66 a first sealing ring 82.1 is arranged on an outer circumferential surface of the closure member 78, which is held in place by the retaining ring 80. The guide element 72 abuts the valve body 64 towards the smallest portion of the valve cavity 66.2 and is held in place by the closure member 78 and the retaining ring 80.

The tractor protection control piston 76 is slidably arranged inside a cylinder 77 formed in the guide element 72 and biased towards a protection position 84 (shown in FIG. 4) by the piston spring 74 arranged on a first side 86 of the piston 76. In the protection position 84 the piston 76 abuts the closure member 78. For moving the tractor protection control piston 76 against the piston spring 74 and towards a supply position (not shown) pressurized air can be supplied to a protection control chamber 88 arranged on a second side 90 of the tractor protection control piston 76 opposite the first side 86. The first side 86 of the piston 76 is connected to the exhaust 16 via the tractor protection exhaust port 54.4 while the protection control chamber 88 is connected to the tractor protection pilot port 54.3 for receiving the protection pressure pPR. When an opening force F1 on the tractor protection control piston 76 resulting from a pressure difference between the first side 86 and the second side 90 is larger than a closing force F2 provided by the piston spring 74, the piston is moved from the protection position 84 to the supply position. To prevent leakage of pressurized air from the protection control chamber 88 a lip seal 91 is arranged on the tractor protection control piston 76 and a second sealing ring 82.2 as well as a third sealing ring 82.3 are arranged on the guide element 72.

In the protection position 84, the tractor protection exhaust port 54.4 is fluidically connected to the tractor protection working port 54.2 via an internal channel 92 of the tractor protection control piston 76. In particular, the tractor protection exhaust port 54.4 is fluidically connected to the tractor protection working port 54.2 via an exhaust opening 93 of the internal channel 92, the internal channel 92, a second opening 94 of the internal channel 92 and a bore 98 in the guide element 72. The second opening 94 is arranged in an end portion 99 of the tractor protection control piston 76 opposite the protection control chamber 88. Flow of pressurized air from the tractor protection working port 54.2 to the tractor protection exhaust port 54.4 on an outer circumferential surface of the tractor protection control piston 76 is prevented by a fourth sealing ring 82.4.

When the tractor protection control piston 76 is in the protection position 84, the tractor protection inlet port 54.1 and the tractor protection working port 54.2 are fluidically separated by the sealing valve member 70. A sealing surface 95 of the sealing valve member 70 abuts a valve seat 96 arranged on the guide element 72 (separating position 97) such that air flow from the tractor protection inlet port 54.1 to the tractor protection working port 54.2 is prevented. The sealing valve member 70 is biased in this separating position 97 by the sealing valve spring 68 and is additionally biased in the separating position 97 if a positive pressure difference (not shown) exists between the tractor protection inlet port 54.1 and the tractor protection working port 54.2. A flow of pressurized air from the tractor protection inlet port 54.1 to the tractor protection working port 54.2 on an outer circumferential surface of the guide element 72 is prevented by a fifth sealing ring 82.5.

As described above, the tractor protection control piston 76 is movable from the protection position 84 to the supply position by providing a protection pressure pPR to the protection control chamber 88. With regard to FIG. 4, the tractor protection control piston 76 then moves to the left and abuts the sealing valve member 70. If the opening force F1 is larger than the closing force F2 and a valve member closing force F3 provided by the sealing valve spring 68 the sealing valve member 70 is moved to a supply position (not shown) wherein the sealing surface 95 is separated from the valve seat 96. It shall be noted that in order to move the sealing valve member 70 to the supply position the opening force F1 needs to further exceed an additional closing force on the sealing valve member 70 resulting from a pressure difference (not shown) between the tractor protection inlet port 54.1 and the tractor protection working port 54.2.

The second opening 94 of the internal channel 92 is arranged such that it is closed by the sealing valve member 70 when the tractor protection control piston 76 abuts the sealing valve member 70. Hence, air flow from the tractor protection inlet port 54.1 and the tractor protection working port 54.2 to the tractor protection exhaust port 54.4 is blocked and leakage of pressurized air is prevented, when the sealing valve member 70 is in the supply position.

Figure 5:
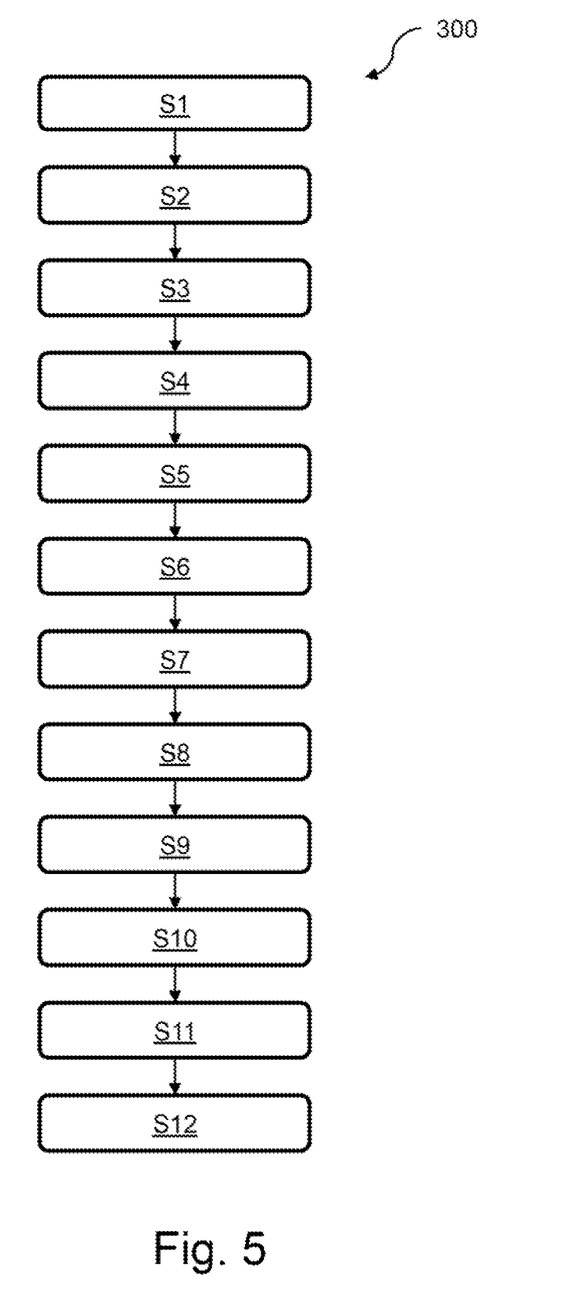
FIG. 5 illustrates a method for controlling a trailer supply function of an electropneumatic braking system.

An embodiment of a method 300 for controlling a trailer supply function of an electropneumatic braking system 100 is illustrated in FIG. 5. In a first step S1 a supply pressure pS is supplied to an air supply connection 2a, 2b of an electropneumatic trailer control module 1 of the electropneumatic braking system 100. In as second step S2 the supply pressure pS is received at an electropneumatic trailer control valve arrangement 20. In a third step S3 an electropneumatic pilot control unit 28 of the trailer control valve arrangement 20 receives trailer braking control signals STB and provides a first pilot control pressure pPC corresponding to the trailer braking control signals STB. The first pilot control pressure pPC as well as supply pressure pS is received at a main valve unit 30 of the electropneumatic trailer control valve arrangement 20 which then provides a trailer control pressure pTC corresponding to the first pilot control pressure pPC in a fourth step S4.

As a fifth step S5 a pneumatic protection pressure pPR is received at a protection connection 10 of the electropneumatic trailer control module 1 and provided (sixth step S6) to a tractor protection pilot port 54.3 of a tractor protection unit 22. Dependent on the level of the pneumatic protection pressure pPR and the state the tractor protection unit 22 is in, multiple further steps are possible:

If the tractor protection unit 22 is in a supply state 60 and the pneumatic protection pressure pPR exceeds a protection threshold TP the tractor protection unit 22 remains in the supply state 60 (seventh step S7).

If upon reception of the pneumatic protection pressure pPR the tractor protection unit 22 is in a protection state 56 and the pneumatic protection pressure pPR exceeds a supply threshold TS, the tractor protection unit 22 switches to the supply state 60 from the protection state 56 in an eighth step S8.

If the tractor protection unit 22 is in the protection state 56 and the pneumatic protection pressure pPR remains below the supply threshold TS, the tractor protection unit 22 remains in the protection state 56 (ninth step S9).

As a tenth step S10, the tractor protection unit 22 switches from the supply state 60 to the protection state 56 if the tractor protection unit 22 is in the supply state 60 and the pneumatic protection pressure pPR falls below the protection threshold TP.

Whenever the tractor protection unit 22 is in the supply state 60 a trailer control pressure pTC is supplied to the trailer control connection 6 as an eleventh step S11. It should be noted that the trailer control pressure pTC may also be equal to an environmental pressure if the pilot control pressure pPC is provided accordingly. As a twelfths step S12 the trailer control connection 6 is connected to an exhaust 16 whenever the tractor protection unit 22 is in the protection position 84.

LIST OF REFERENCE SIGNS (PART OF THE DESCRIPTION)

1 electropneumatic trailer control module
2 supply connection
4 trailer supply connection
6 trailer control connection
8 redundancy connection
10 protection connection
12 protection pilot line
14 housing
16 exhaust
18 exhaust silencer
20 electropneumatic trailer control valve arrangement
22 tractor protection unit
24 electronic trailer control connection
26 electric connection strip
28 electropneumatic pilot control unit
29 pressure sensor
30 main valve unit
32 control valve supply port
34a, b primary supply lines
36 secondary supply line
38 check valve
40 working port
42 first electropneumatic control valve
42.1 first electropneumatic supply port
42.2 first electropneumatic working port
42.3 first solenoid
44 second electropneumatic control valve
44.1 second electropneumatic supply port
44.2 second electropneumatic working port
44.3 second solenoid
46 third electropneumatic control valve
46.1 third electropneumatic supply port
46.2 third electropneumatic working port
46.3 third solenoid
46.4 third exhaust port
48 exhaust line
50 pilot control line
52 relay valve
52.1 relay valve supply port
52.2 relay valve working port
52.3 relay valve control port
52.4 relay valve exhaust port
54 tractor protection valve
54.1 tractor protection inlet port
54.2 tractor protection working port
54.3 tractor protection pilot port
54.4 tractor protection exhaust port
56 protection state
58 spring
60 supply state
62 tertiary supply line
64 valve body
66 valve cavity
66.1 biggest portion of the valve cavity
66.2 smallest portion of the valve cavity
68 sealing valve spring
70 sealing valve member
72 guide element
74 piston spring
76 tractor protection control piston 77 cylinder
78 closure member
80 retaining ring.
82.1 first sealing ring
82.2 second sealing ring
82.3 third sealing ring
82.4 fourth sealing ring
82.5 fifth sealing ring
84 protection position
86 first side
88 protection control chamber
90 second side
91 lip seal
92 internal channel
93 exhaust opening
94 second opening
95 sealing surface
96 valve seat
97 separating position
98 bore
99 end portion
100 electropneumatic braking system
102 first brake circuit
104 front axle brake circuit
106 second brake circuit
108 rear axle brake circuit
110 trailer control circuit
112 first compressed air supply
114 external control valve
116 dash valve
118 second compressed air supply
120 main electronic control unit (mECU)
122 rear axle modulator
124 control unit
126 front axle modulator
128a, b front axle ABS-modules
130a, b front axle brake actuators
132 foot brake module
134 electropneumatic foot brake module
136 arrow
138 foot brake signal line
140a, b, c, d rear axle brake actuators
142 park brake module
144 protection line
146 brake signal line
148 redundancy line
150 supply coupling head
152 control coupling head.
154 first supply line
156 second supply line
200 tractor vehicle
202 commercial vehicle
300 method
FA front axle
F1 opening force
F2 closing force
F3 valve member closing force
RA rear axle
pB braking pressure
pBFA front axle braking pressure
pBPB park braking pressure
pBR redundancy pressure
pBRA rear axle braking pressure
pTC trailer control pressure
pTS trailer supply pressure
pPC first pilot control pressure
pPR protection pressure pS supply pressure
SFB foot brake signals
SPB park brake signals
SRA rear axle brake signals
SB electronic braking signals
S1, S2, S3, etc. steps
SS sensor signals
STB1, 2, 3 trailer braking control signals
TP protection threshold
TS supply threshold

What is claimed is:

1. An electropneumatic trailer control module (1) for an electropneumatic braking system (100) of a tractor-trailer combination, the electropneumatic trailer control module (1) comprising:
an air supply connection (2) configured to be connected to a compressed air supply (112, 118) providing a supply pressure (pS),
a trailer supply connection (4) configured to deliver a trailer supply pressure (pTS) for the trailer vehicle,
a trailer control connection (6) configured to deliver a trailer control pressure (pTC) for the trailer vehicle,
an electropneumatic trailer control valve arrangement (20) at least connected to the air supply connection (2) and configured to receive the supply pressure (pS) and to provide the trailer control pressure (pTC),
an electronic trailer control connection (24) for receiving electronic braking signals (SB) and providing respective trailer braking control signals (STB) at the electropneumatic trailer control valve arrangement (20) for modulating the trailer control pressure (pTC),
a protection connection (10) for receiving a pneumatic protection pressure (pPR), and
a tractor protection unit (22) comprising a tractor protection pilot port (54.3) fluidically connected to the protection connection (10),
wherein the tractor protection unit (22) is configured to switch between a supply state (60) and a protection state (56) dependent on the pneumatic protection pressure (pPR),
wherein the trailer control pressure (pTC) is only provided to the trailer control connection (6) when the tractor protection unit (22) is in the supply state (60), and
wherein the trailer control connection (6) is connected to an exhaust (16) when the tractor protection unit (22) is in the protection state (56).

2. The electropneumatic trailer control module (1) according to claim 1, wherein the tractor protection unit (22) is configured to switch to the protection state (56) when the pneumatic protection pressure (pPR) falls below a predetermined protection threshold (TP), and to switch to the supply state (60) when the pneumatic protection pressure (pPR) exceeds a predetermined supply threshold (TS), wherein the predetermined supply threshold (TS) is higher than the predetermined protection threshold (TP).

3. The electropneumatic trailer control module (1) according to claim 1, wherein the tractor protection unit (22) comprises a pneumatically controlled tractor protection valve (54) that includes the tractor protection pilot port (54.3), a tractor protection working port (54.2), a tractor protection inlet port (54.1), and a tractor protection exhaust port (54.4) fluidically connected to the exhaust (16).

4. The electropneumatic trailer control module (1) according to claim 1, wherein the electropneumatic trailer control valve arrangement (20) comprises an electropneumatic pilot control unit (28) configured to provide a first pilot control pressure (pPC), and a pneumatically controlled main valve unit (30) configured to receive the first pilot control pressure (pPC) and to provide a trailer control pressure (pTC) dependent on the first pilot control pressure (pPC).

5. The electropneumatic trailer control module (1) according to claim 1, further comprising a redundancy connection (8) for receiving a redundancy pressure (pBR), wherein the electropneumatic trailer control module (1) is configured to provide a trailer control pressure (pTC) to the trailer control connection (6) dependent on the redundancy pressure (pBR), when the electropneumatic trailer control valve arrangement (20) is de-energized and/or is defective.

6. The electropneumatic trailer control module (1) according to claim 3, wherein the tractor protection inlet port (54.1) is fluidically connected to a working port (40, 52.2) of the electropneumatic trailer control valve arrangement (20) for receiving the trailer control pressure (pTC) and wherein the tractor protection working port (54.2) is fluidically connected to the trailer control connection (6).

7. The electropneumatic trailer control module (1) according to claim 3, wherein the tractor protection inlet port (54.1) is fluidically connected to the air supply connection (2), and wherein the tractor protection working port (54.2) is fluidically connected to a control valve supply port (32) of the electropneumatic trailer control valve arrangement (20).

8. The electropneumatic trailer control module (1) according to claim 3, wherein the pneumatically controlled tractor protection valve (54) comprises a tractor protection control piston (76) slidably arranged in a cylinder (77) between a protection position (84) and a supply position, the tractor protection control piston (76) comprising an internal channel (92) having an exhaust opening (93) fluidically connected to the tractor protection exhaust port (54.4) and a second opening (94) in an end portion (99) of the tractor protection control piston (76), wherein the tractor protection working port (54.2) is fluidically connected to the tractor protection exhaust port (54.4) via the internal channel (92) when the tractor protection control piston (76) is in the protection position (84), and wherein the internal channel (92) is closed and the tractor protection working port (54.2) is fluidically connected to tractor protection inlet port (54.1), when the tractor protection control piston (76) is in the supply position.

9. The electropneumatic trailer control module (1) according to claim 8, wherein the pneumatically controlled tractor protection valve (54) further comprises a protection control chamber (88) arranged on a second side (90) of the tractor protection control piston (76) opposite a first side (86), wherein the protection control chamber (88) is fluidically connected to the tractor protection pilot port (54.3) and the tractor protection control piston (76) is movable from the protection position (84) to the supply position by providing pressurized air at an opening pressure to the protection control chamber (88).

10. The electropneumatic trailer control module (1) according to claim 8, wherein the pneumatically controlled tractor protection valve (54) further comprises a sealing valve member (70) movably arranged between a connection position, wherein a sealing surface (95) of the sealing valve member (70) is separated from a valve seat (96) of the sealing valve member (70) such that the tractor protection inlet port (54.1) and the tractor protection working port (54.2) are fluidically connected and a separating position (97), wherein the sealing surface (95) abuts the valve seat (96) for separating the tractor protection inlet port (54.1) from the tractor protection working port (54.2), wherein the sealing valve member (70) is in the connection position when the tractor protection control piston (76) is in the supply position, and wherein the sealing valve member (70) is in the separating position (97) when the tractor protection control piston (76) is in the protection position (84).

11. The electropneumatic trailer control module (1) according to claim 10, wherein the end portion (99) of the tractor protection control piston (76) is configured to abut the sealing valve member (70) for moving the sealing valve member (70) from the separating position (97) to the connection position when the tractor protection control piston (76) is moved to the supply position, wherein the second opening (94) of the internal channel (92) is preferably closed by the sealing valve member (70) when the end portion (99) abuts the sealing valve member (70).

12. The electropneumatic trailer control module (1) according to claim 1, comprising a housing (14), wherein the tractor protection unit (22) is disposed in or integral to the housing (14) of the electropneumatic trailer control module (1).

13. An electropneumatic braking system (100) for a tractor vehicle (200) of a tractor-trailer combination, comprising:
at least a first brake circuit (102) including brake actuators (130a, 130b, 140a, 140b, 140c, 140d) for braking the tractor vehicle (200),
one or more compressed air supplies (112, 118), and
a trailer control circuit (110) including:
a supply coupling head (150),
a control coupling head (152),
the electropneumatic trailer control module (1) according to claim 1, and
an external control valve (114),
wherein the external control valve (114) is connected to a compressed air supply (112, 118) of the one or more compressed air supplies (112, 118);
wherein the air supply connection (2) of the electropneumatic trailer control module (1) is connected to a compressed air supply (112, 118) of the one or more compressed air supplies (112, 118),
wherein the trailer supply connection (4) of the electropneumatic trailer control module (1) is connected to a supply coupling head (150);
wherein the trailer control connection (6) of the electropneumatic trailer control module (1) is connected to the control coupling head (152); and
wherein the protection connection (10) of the electropneumatic trailer control module (1) is connected to the external control valve (114).

14. A method (300) for controlling a trailer supply function of an electropneumatic braking system (100) of a tractor vehicle (200) of a tractor-trailer combination, preferably an electropneumatic braking system (100) according to claim 13, comprising the steps of:
supplying (S1) a supply pressure (pS) to an air supply connection (2) of an electropneumatic trailer control module (1) of the electropneumatic braking system (100);
receiving (S2) the supply pressure (pS) at an electropneumatic trailer control valve arrangement (20) of the electropneumatic trailer control module (1);
providing (S4) a trailer control pressure (pTC) by the electropneumatic trailer control valve arrangement (20), receiving (S5) a pneumatic protection pressure (pPR) at a protection connection (10) of the electropneumatic trailer control module (1);

switching (S8) a tractor protection unit (22) of the electropneumatic trailer control module (1) in a supply state (60) and providing (S11) the trailer control pressure (PTC) to a trailer control connection (6) of the electropneumatic trailer control module (1) when the pneumatic protection pressure (pPR) received at the protection connection (10) exceeds a predetermined supply threshold (TS); and switching (S10) the tractor protection unit (22) in a protection state (56) and connecting the trailer control connection (6) to an exhaust (16) when the pneumatic protection pressure (pPR) falls below a protection threshold (TP).

15. The method (200) according to claim 14, further comprising the step:

providing (S12) the trailer control pressure (pTC) to the trailer control connection (6) when the pneumatic protection pressure (pPR) falls below the supply threshold (TS) but exceeds the protection threshold (TS) (S9).

16. A tractor vehicle (200) of a tractor-trailer combination, comprising the electropneumatic braking system (100) according to claim 13.

* * * * *